(12) United States Patent
Jefremow et al.

(10) Patent No.: US 12,255,483 B2
(45) Date of Patent: Mar. 18, 2025

(54) MULTI PATH BATTERY CHARGER

(71) Applicant: Renesas Electronics America Inc., Milpitas, CA (US)

(72) Inventors: Mihail Jefremow, Dusseldorf (DE); Amit Bavisi, Saratoga, CA (US); Jiangjian Huang, San Jose, CA (US); Xue Ke, Beijing (CN); Turev Acar, Foster City, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 17/802,790

(22) PCT Filed: May 31, 2022

(86) PCT No.: PCT/CN2022/096127
§ 371 (c)(1),
(2) Date: Aug. 26, 2022

(87) PCT Pub. No.: WO2023/230808
PCT Pub. Date: Dec. 7, 2023

(65) Prior Publication Data
US 2024/0204550 A1  Jun. 20, 2024

(51) Int. Cl.
*H02J 50/10* (2016.01)
*H02J 7/00* (2006.01)

(52) U.S. Cl.
CPC ........ *H02J 7/00712* (2020.01); *H02J 7/0042* (2013.01); *H02J 50/10* (2016.02)

(58) Field of Classification Search
CPC ....... H02J 7/00712; H02J 7/0042; H02J 50/10

USPC ........... 320/107, 108, 134, 162; 307/104, 23
See application file for complete search history.

(56) References Cited

U.S. PATENT DOCUMENTS

| | | | |
|---|---|---|---|
| 2016/0087462 A1* | 3/2016 | Kudo | H02J 7/00 320/162 |
| 2017/0077743 A1 | 3/2017 | Liu et al. | |
| 2021/0075244 A1 | 3/2021 | Cho et al. | |
| 2021/0384749 A1 | 12/2021 | Liao | |
| 2023/0080119 A1* | 3/2023 | Cho | H02J 7/02 320/128 |

FOREIGN PATENT DOCUMENTS

| | | |
|---|---|---|
| CN | 104704704 A | 6/2015 |
| CN | 108879841 A | 11/2018 |
| CN | 109672254 A | 4/2019 |
| CN | 112491105 A | 3/2021 |

OTHER PUBLICATIONS

International Search Report and Written Opinion dated Dec. 16, 2022 issued in International Application No. PCT/CN2022/096127.

* cited by examiner

*Primary Examiner* — Elim Ortiz
(74) *Attorney, Agent, or Firm* — SCULLY, SCOTT, MURPHY & PRESSER, P.C.

(57) ABSTRACT

In an embodiment, a semiconductor device is disclosed that includes a wired input/output, a wireless input/output, and a battery. A wired charging path between the wired input/output and the battery includes a first transistor and a second transistor. A wireless charging path between the wireless input/output and the battery includes a third transistor and the second transistor.

20 Claims, 6 Drawing Sheets

MULTI PATH BATTERY CHARGER

CROSS-REFERENCE TO RELATED APPLICATIONS

This application is a national phase entry of PCT International Application No. PCT/CN2022/096127, filed on May 31, 2022. The disclosure of PCT International Application No. PCT/CN2022/096127 is incorporated by reference herein.

BACKGROUND OF THE SPECIFICATION

The present disclosure relates in general to apparatuses and methods for wireless and wired charging systems.

Charging systems often utilize multiple integrated circuits to perform various functions. For example, in some charging systems, a battery charging integrated circuit is utilized to manage charging of a battery, a power multiplexing integrated circuit is utilized to manage switching between wired and wireless charging modes and a wireless power integrated circuit is utilized to manage wireless charging. However, such charging systems may be inefficient and require a significant footprint on the multiple integrated circuits.

SUMMARY

In an embodiment, a semiconductor device is disclosed that comprises a wired input/output, a wireless input/output, and a battery. A wired charging path between the wired input/output and the battery comprises a first transistor and a second transistor. A wireless charging path between the wireless input/output and the battery comprises a third transistor and the second transistor.

In another embodiment, a method is disclosed that comprises detecting a current difference across a first transistor of a semiconductor device. The semiconductor device comprises the first transistor, a second transistor and a third transistor. The first transistor and the second transistor are disposed on a wired charging path of the semiconductor device between a wired input/output of the semiconductor device and a battery of the semiconductor device. The first transistor and the third transistor are disposed on a wireless charging path of the semiconductor device between a wireless input/output of the semiconductor device and the battery. The method further comprises generating a signal based at least in part on the current difference and transmitting the signal to a rectifier controller of the semiconductor device. The rectifier controller is configured to control an activation of the third transistor based at least in part on the signal.

In another embodiment, an integrated circuit is disclosed that comprises a wired input/output, a wireless input/output, and a battery. A wired charging path between the wired input/output and the battery comprises a wired connector transistor, a regulator transistor and a charger transistor. A wireless charging path between the wireless input/output and the battery comprises a rectifier transistor, the regulator transistor and the charger transistor. The integrated circuit further comprises a rectifier controller that is configured to control an activation of the rectifier transistor and a power flow detector circuit that is configured to detect a current difference across the regulator transistor, generate a signal based at least in part on the current difference and transmit the signal to the rectifier controller. The rectifier controller is configured to control the activation of the rectifier transistor based at least in part on the signal.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

Figure 1:
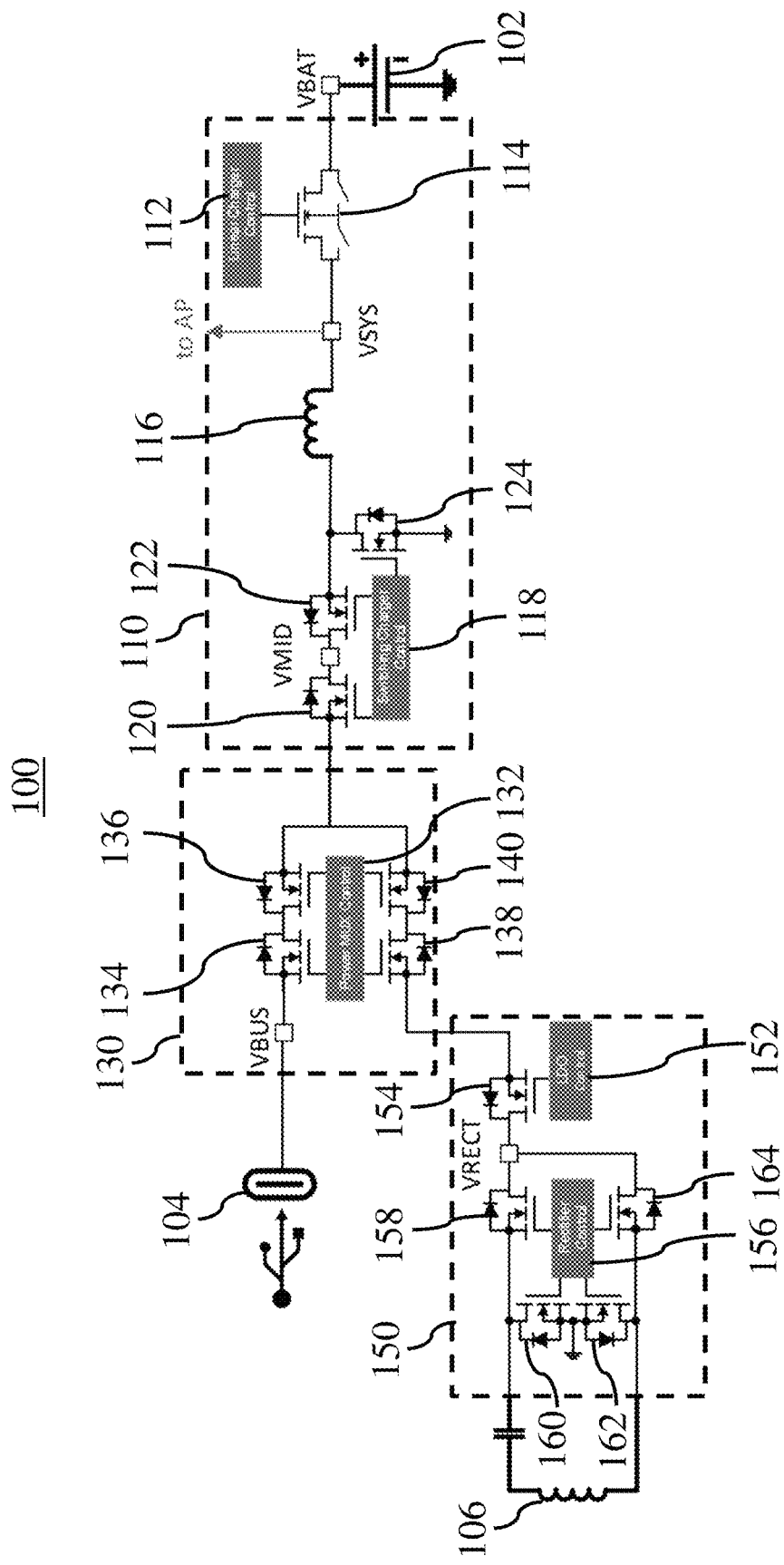
FIG. 1 is a circuit diagram of a charging system according to an embodiment.

FIG. 1 is a diagram of an example charging system 100 comprising a battery 102, wired input/output 104, wireless input/output 106, battery charger circuit 110, power multiplexer (MUX) circuit 130 and wireless power circuit 150. Charging system 100 utilizes discrete integrated circuits for each of the battery charger circuit 110, power MUX circuit 130 and wireless power circuit 150. Battery 102 may comprise, for example, a capacitor, or other device that is configured to store and discharge energy. Wired input/output 104 may comprise, for example, a wired connection such as a universal serial bus (USB) port, or another wired connection. Wireless input/output 106 may comprise, for example, a coil or other wireless connection. Nodes between the various components or connections in charging system 100 are labeled for ease of understanding and reference including, e.g., VRECT, VBUS, VMID, VSYS and VBAT.

Battery charger circuit 110 comprises a linear charger controller 112 that controls switching elements 114, a coil 116, a switching charger controller 118 and charger transistors 120, 122 and 124, e.g., power transistors or other switching transistors. Switching charger controller 118 controls the activation of charger transistors 120, 122 and 124.

Power MUX circuit 130 comprises a power MUX controller 132 that controls the activation of power MUX transistors 134, 136, 138 and 140, e.g., power transistors or other switching transistors, depending on which of the wired input/output 104 and the wireless input/output 106 is in use. For example, power MUX controller 132 may activate power MUX transistors 134 and 136 when wired input/output 104 is in use and may activate power MUX transistors 138 and 140 when wired input/output 106 is in use.

Wireless power circuit 150 comprises a low-dropout regulator (LDO) controller 152 that controls the activation of an LDO transistor 154 and a rectifier controller 156 that controls the activation of rectifier transistors 158, 160, 162 and 164 to supply power to wireless input/output 106, e.g. a coil.

As shown in FIG. 1, the wired current flow path from wired input/output 104 to battery 102 runs through two pairs of transistors, i.e., power MUX transistors 134 and 136 and charger transistors 120 and 122, and the wireless current flow path from wireless input/output 106 flows through three pairs of transistors, i.e., one of rectifier transistors 158 and 164, LDO transistor 154, power MUX transistors 138 and 140 and charger transistors 120 and 122.

Figure 2:
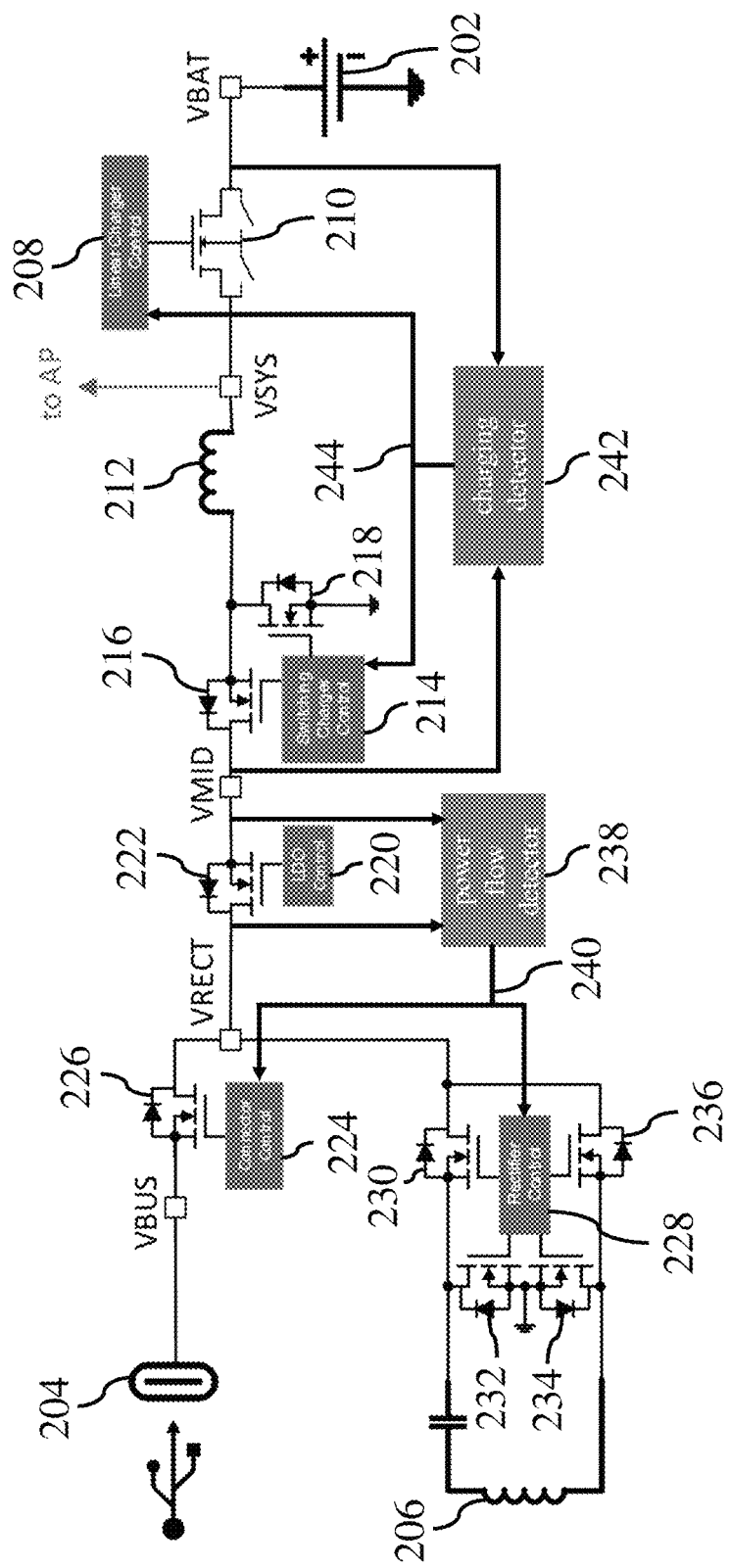
FIG. 2 is a circuit diagram of a charging system according to another embodiment.

With reference now to FIG. 2, a charging system 200 according to an illustrative embodiment is illustrated. Charging system 200 provides increased efficiency over charging system 100 by integrating the wired and wireless charging functionality into a single semiconductor device such as, e.g., an integrated circuit, printed circuit board (PCB), or other semiconductor device. In addition, charging system 200 also reduces the number of components and the number of transistors on each of the wired and wireless charging paths which results in a reduced ohmic resistance and greater efficiency as compared to charging system 100.

Charging system 200 comprises a battery 202, wired input/output 204, wireless input/output 206, a linear charger controller 208 that controls switching elements 210, a coil 212, a switching charger controller 214 that controls charger transistors 216 and 218, an LDO controller 220 that controls an LDO transistor 222, a connector controller 224 that controls a connector transistor 226 and a rectifier controller 228 that controls rectifier transistors 230, 232, 234 and 236. Nodes between the various components or connections in charging system 200 are labeled for ease of understanding and reference including, e.g., VBUS, VRECT, VMID, VSYS and VBAT.

As seen in FIG. 2, the wired charging path and the wireless charging path merge at VRECT with each of the wired charging path and the wireless charging path only comprising three transistors. For example, the wired charging path comprises connector transistor 226, LDO transistor 222 and charger transistor 216 while the wireless charging path comprises LDO transistor 222, charger transistor 216 and one of rectifier transistors 230 and 236. In some embodiments, LDO transistor 222 is optional, as shown, for example, in FIG. 5.

Reducing the number of transistors in each of the wired and wireless charging paths, however, may present some challenges. For example, power MUX circuit 130 of FIG. 1 controls multiplexing between wired input/output 104 and wireless input/output 106 and includes back to back power MUX transistors 138 and 140 that inhibit current flow from VBAT to VRECT in wireless power circuit 150 during a low quiescent-current (Iq) state of charging system 100 which are not present in charging system 200.

In order to handle back current flow from VBAT to VRECT in the low Iq state, charging system 200 further comprises a power flow detector circuit 238 that is configured to measure a current difference between VMID and VRECT, e.g., the current difference across LDO transistor 222 in this embodiment. In other embodiments, power flow detector circuit 238 may measure a current difference between any other nodes or across any other components of charging system 200.

Figure 3:
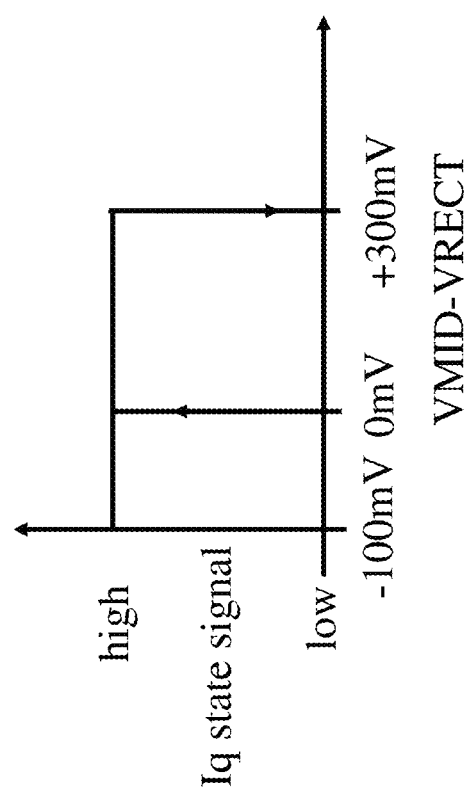
FIG. 3 is a diagram illustrating example signal states output by a power flow detector of the charging system of FIG. 2 according to an embodiment.

With reference to FIGS. 2 and 3, power flow detector circuit 238 is configured to provide an Iq state signal 240 to connector controller 224, rectifier controller 228, to both or to any other components of charging system 200 in response to a measurement of a current flow difference between VRECT and VMID. For example, if the current flow at VRECT is smaller than the current flow at VMID by a first threshold amount, e.g., 300 mV or any other amount, power flow detector circuit 238 is configured to provide Iq state signal 240 to connector controller 224, rectifier controller 228, or both, that commands connector controller 224, rectifier controller 228, or both, to enter a standby state, e.g., deactivate one or more of their corresponding transistors. For example, Iq state signal 240 may be set to low when in the standby state. In some embodiments, the Iq state signal 240 may cause some or all active circuits on the wireless charging path to enter the standby state in response the current flow at VRECT being smaller than the current flow at VMID by the first threshold amount. Examples of the active circuits on the wireless charging path may comprise rectifier controller 228, ping detection circuitry, analog infrastructure LDOs, band gap circuitry, or any other circuitry utilized for the wireless charging path of a charging system.

In another example, if the current flow at VRECT is greater than the current flow at VMID by a second threshold amount, e.g., by 100 mV or any other amount, power flow detector circuit 238 is configured to provide Iq state signal 240 to connector controller 224, rectifier controller 228, or both, that commands connector controller 224, rectifier controller 228, or both, to enter an active state, e.g., activate one or more of their corresponding transistors. For example, Iq state signal 240 may be set to high when in the active state. In some embodiments, Iq state signal 240 may cause some or all of the active circuits on the wireless charging path to enter the active state in response the current flow at VRECT being greater than the current flow at VMID by the second threshold amount. In some embodiments, for example, the wired charging path, the wireless charging path, or both may start powering VRECT and cause VRECT to rise above VMID by the second threshold amount and Iq state signal 240 may be utilized to drive charging system 200 into the active state to begin performing charging or power supply operations, e.g., ping detection or other operations.

Because both the wired current path and the wireless current path utilize the same components between VRECT and VBAT, simultaneous operation of both the wired current path and wireless current path may occur during startup without the need for an additional control to autonomously charge up the VRECT node, e.g., in the case of a dead battery. In some embodiments, for example, wired input/output 104 may be utilized to power wireless input/output 206, even when battery 202 does not have sufficient charge to power wireless input/output 206, with a minimal number of intervening transistors, e.g., only connector transistor 226 and rectifier transistors 230 and 236 in the power supply pathway between wired input/output 204 and wireless input/output 206.

With continued reference to FIG. 2, in some embodiments, charging system 200 further comprises a charging detector circuit 242 that measures a current difference between VMID and VBAT and is configured to send a charge mode signal 244 to linear charger controller 208 and switching charger controller 214 to enable or disable a charging operation based on the current difference. For example, in some embodiments, charging detector circuit 242 may be configured to send charge mode signal 244 to linear charger controller 208 and switching charger controller 214 to command linear charger controller 208 and switching charger controller 214 to enable the charging operation in response to a current at VMID being greater than a current at VBAT which indicates that excess power is available to charge battery 202.

Figure 4:
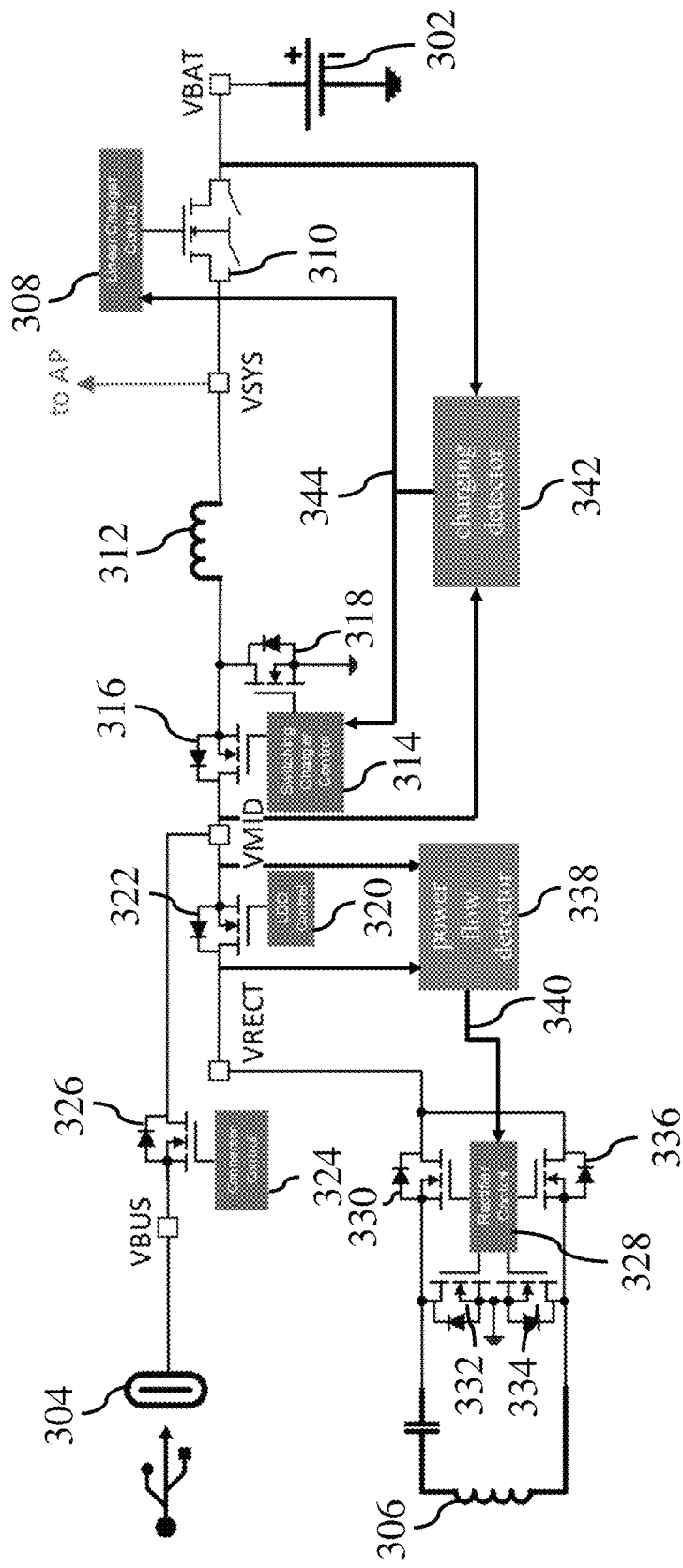
FIG. 4 is a circuit diagram of a charging system according to another embodiment.

With reference to FIG. 4, a charging system 300 according to another embodiment will be described. Charging system 300 comprises similar components to charging system 200 including a battery 302, wired input/output 304, wireless input/output 306, a linear charger controller 308 that controls switching elements 310, a coil 312, a switching charger controller 314 that controls charger transistors 316 and 318, an LDO controller 320 that controls an LDO transistor 322, a connector controller 324 that controls a connector transistor 326 and a rectifier controller 328 that controls rectifier transistors 330, 332, 334 and 336, a power flow detector circuit 338 that is configured to send an Iq state signal 340 to rectifier controller 328, and a charging detector circuit 342 that is configured to send a charge mode signal 344 to linear charger controller 308 and switching charger controller 314. Nodes between the various components or connections in charging system 300 are labeled for ease of understanding and reference including, e.g., VBUS, VRECT, VMID, VSYS and VBAT.

The components of charging system 300 are configured to function in a similar manner to that described above for charging system 200 except that as shown in FIG. 4, the wired charging path from wired input/output 304 to battery 302 is connected at VMID instead of VRECT. By connecting the wired charging path at VMID instead of VRECT, the wired charging path gains the benefit of only traversing two transistors from VBUS to VBAT, i.e., connector transistor 326 and charger transistor 316, which provides greater efficiency to the wired charging path during wired charging at the cost of a reduced efficiency between wired input/output 304 and wireless input/output 306 when wireless input/output 306 is powered by wired input/output 304 due to the addition of LDO transistor 322 in that path. In addition, in some embodiments, a separate current sensing circuit may need to be utilized to detect back flow or other currents in the wired charging path since the measurement by power flow detector circuit 338 is between VRECT and VMID across LDO transistor 322 which is no longer in the wired charging path from VBUS to VBAT.

Figure 5:
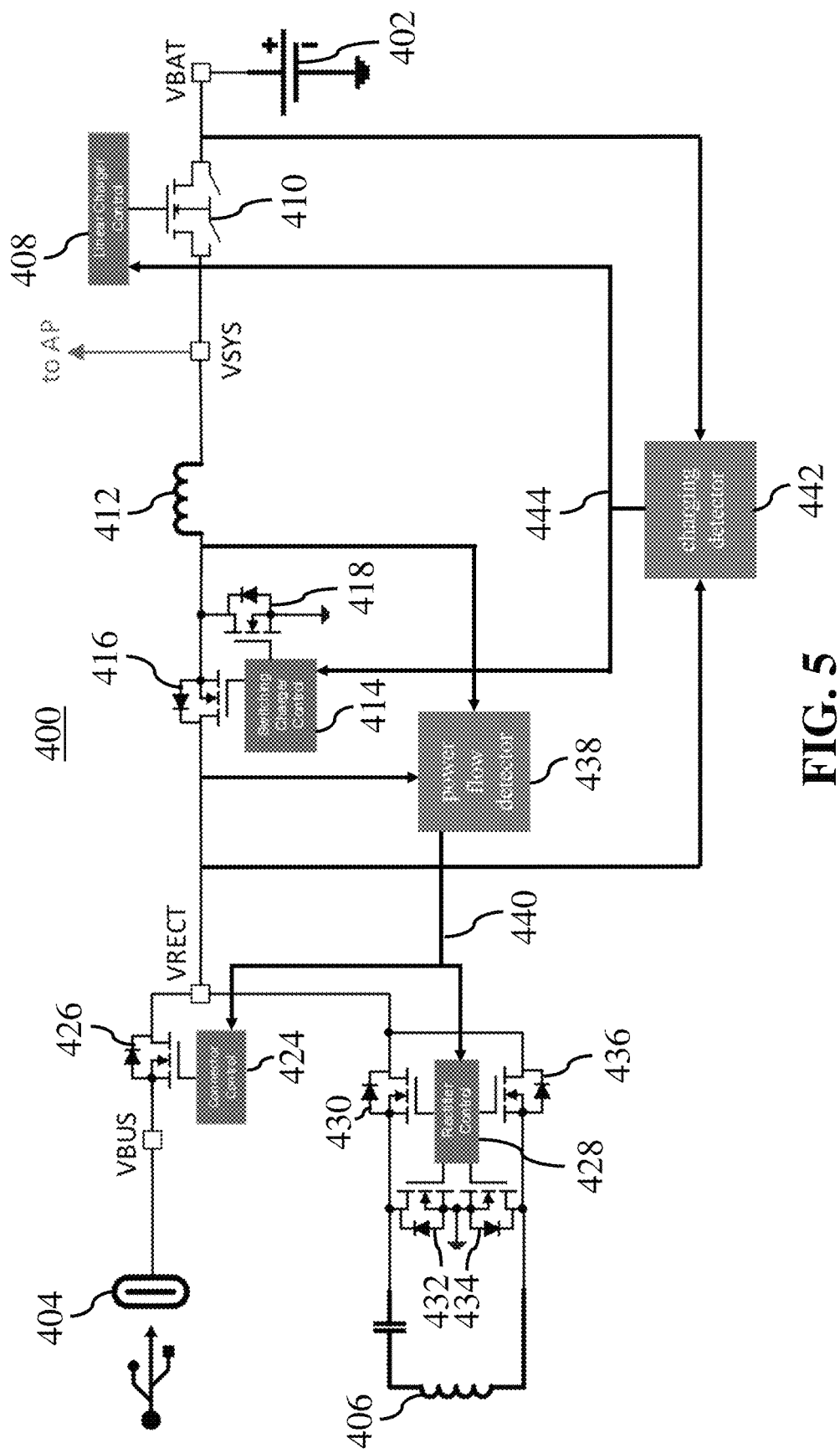
FIG. 5 is a circuit diagram of a charging system according to another embodiment.

With reference to FIG. 5, a charging system 400 according to another embodiment will be described. Charging system 400 comprises similar components to charging system 200 including a battery 402, wired input/output 404, wireless input/output 406, a linear charger controller 408 that controls switching elements 410, a coil 412, a switching charger controller 414 that controls charger transistors 416 and 418, a connector controller 424 that controls a connector transistor 426, a rectifier controller 428 that controls rectifier transistors 430, 432, 434 and 436, a power flow detector circuit 438 that is configured to send an Iq state signal 440 to rectifier controller 428, connector controller 424, or both, and a charging detector circuit 442 that is configured to send a charge mode signal 444 to linear charger controller 408 and switching charger controller 414. Nodes between the various components or connections in charging system 400 are labeled for ease of understanding and reference including, e.g., VBUS, VRECT, VSYS and VBAT.

Figure 6:
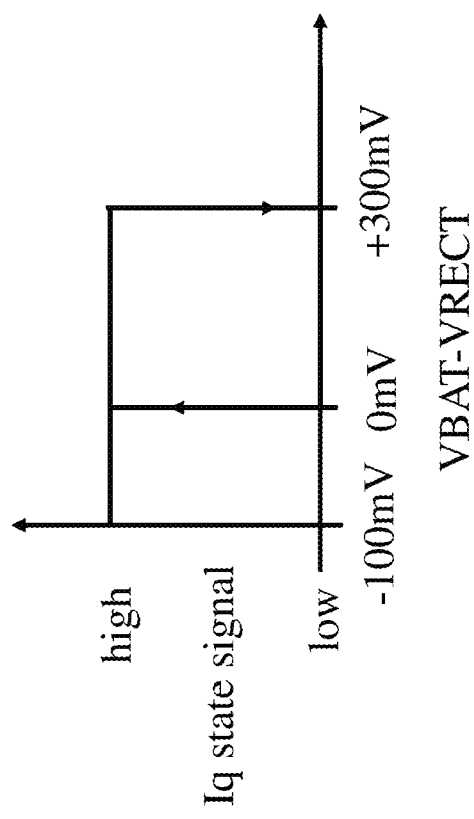
FIG. 6 is a diagram illustrating example signal states output by a power flow detector of the charging system of FIG. 5 according to an embodiment.

The components of charging system 400 are configured to function in a similar manner to that described above for charging system 200 except that as shown in FIG. 5, the LDO transistor has been removed, a node label for VMID is no longer present, power flow detector circuit 438 measures a current difference across charger transistor 416 and charging detector circuit 442 measures a current difference between VRECT and VBAT. As seen in FIG. 5, the wired charging path from wired input/output 404 to battery 402 is connected at VRECT and traverses only two transistors from VBUS to VBAT, i.e., connector transistor 426 and charger transistor 416. Similarly, the wireless charging path also traverses only two transistors, i.e., charger transistor 416 and one of rectifier transistors 430 and 436. The power path between wired input/output 404 and wireless input/output 406 is the same as in charging system 200. As seen in FIGS. 5 and 6, power flow detector circuit 438 of charging system 400 utilizes the difference between VRECT and VBAT, e.g., across charger transistor 416, instead of VRECT and VMID (FIGS. 2 and 3) to determine whether to command rectifier controller 428, connector controller 424, or both, to enter the active or standby state in a similar manner to that described above for charging system 200.

By integrating the functionality for wired and wireless charging into a smaller number of integrated circuits, or one integrated circuit as described in the above embodiments, additional efficiencies may be gained in both the circuit footprint and efficiency of the charging system. For example, reducing the number of transistors in each of the wired and wireless charging paths according to the above embodiments reduces the ohmic resistance of the charging paths and increases the efficiency of the charging systems. In addition, by integrating the wired, wireless, power and charging functionality into a single integrated circuit, a significant reduction in circuit area may be achieved including, for example, a reduction of 30% as compared to a charging system comprising discrete integrated circuits for each function.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A semiconductor device comprising:
   a wired connection;
   a wireless connection;
   a battery;
   a wired charging path between the wired connection and the battery comprising:
      a first transistor; and
      a second transistor;
   a wireless charging path between the wireless connection and the battery comprising:
      a third transistor; and
      the second transistor;
   a charger controller that is configured to control an activation of the second transistor; and a charging detector circuit that is configured to:
  detect current between the third transistor and the battery; and
  transmit a signal to the charger controller based at least in part on current between the third transistor and the battery to control an activation of the second transistor.

2. The semiconductor device of claim 1, wherein the semiconductor device further comprises:
  a wireless rectifier circuit comprising a rectifier controller that is configured to control an activation of the third transistor; and
  a power flow detector circuit that is configured to detect a current difference across the second transistor, the power flow detector circuit being configured to transmit a signal to the rectifier controller, the rectifier controller being configured to control the activation of the third transistor based at least in part on the signal.

3. The semiconductor device of claim 2, wherein:
  the semiconductor device further comprises a connector controller that is configured to control an activation of the first transistor; and
  the power flow detector circuit is configured to transmit the signal to the connector controller, the connector controller being configured to control the activation of the first transistor based at least in part on the signal.

4. The semiconductor device of claim 2, wherein the power flow detector circuit is configured to:
  transmit the signal with a first value in response to the current difference across the second transistor being less than a first threshold value; and
  transmit the signal with a second value in response to the current difference across the second transistor being greater than a second threshold value.

5. The semiconductor device of claim 1, wherein the wireless charging path further comprises a fourth transistor disposed between the third transistor and the second transistor.

6. The semiconductor device of claim 5, wherein the wired charging path further comprises the fourth transistor disposed between the first transistor and the second transistor.

7. The semiconductor device of claim 1, wherein the semiconductor device further comprises:
  a fourth transistor, the fourth transistor being disposed between the third transistor and the second transistor on the wireless charging path;
  the charging detector circuit that comprises the charger controller that is configured to control an activation of the second transistor;
  a regulator controller that is configured to control an activation of the fourth transistor;
  a wireless rectifier circuit comprising a rectifier controller that is configured to control an activation of the third transistor; and
  a power flow detector circuit that is configured to detect a current difference across the fourth transistor, the power flow detector circuit being configured to transmit a signal to the rectifier controller, the rectifier controller being configured to control the activation of the third transistor based at least in part on the signal.

8. The semiconductor device of claim 7, wherein the power flow detector circuit is configured to:
  transmit the signal with a first value in response to the current difference across the fourth transistor being less than a first threshold value; and
  transmit the signal with a second value in response to the current difference across the fourth transistor being greater than a second threshold value.

9. The semiconductor device of claim 1, wherein to detect the current between the third transistor and the battery, the charging detector circuit is configured to:
  detect a first current at a first connection node between the second transistor and the third transistor; and
  detect a second current at a second connection node between the second transistor and the battery.

10. The semiconductor device of claim 9, wherein the charging detector circuit is configured to:
  transmit the signal with a first value in response to the first current being greater than the second current; and
  transmit the signal with a second value in response to the first current being less than or equal to the second current.

11. The semiconductor device of claim 10, wherein the first value corresponds to a command to activate a battery charging operation of the semiconductor device.

12. A method performed by hardware, the method comprising:
  detecting a current difference across a first transistor of a semiconductor device, the semiconductor device comprising the first transistor, a second transistor and a third transistor, the first transistor and the second transistor being disposed on a wired charging path of the semiconductor device between a wired connection of the semiconductor device and a battery of the semiconductor device, the first transistor and the third transistor being disposed on a wireless charging path of the semiconductor device between a wireless connection of the semiconductor device and the battery;
  generating a signal based at least in part on the current difference; and
  transmitting the signal to a rectifier controller of the semiconductor device, the rectifier controller being configured to control an activation of the third transistor based at least in part on the signal.

13. The method of claim 12, wherein the method further comprises transmitting the signal to a connector controller of the semiconductor device, the connector controller being configured to control an activation of the second transistor based at least in part on the signal.

14. The method of claim 12, wherein generating the signal based at least in part on the current difference comprises:
  generating the signal with a first value in response to the current difference across the first transistor being less than a first threshold value; and
  generating the signal with a second value in response to the current difference across the first transistor being greater than a second threshold value.

15. The method of claim 12, wherein the method further comprises:
  detecting a first current at a first connection node between the first transistor and the third transistor;
  detecting a second current at a second connection node between the first transistor and the battery;
  generating a second signal based at least in part of the first current and the second current; and
  transmitting the second signal to a charger controller of the semiconductor device, the charger controller being configured to control the activation of the first transistor based at least in part on the second signal.

16. The method of claim 15, wherein generating the second signal comprises:

generating the second signal with a first value in response to the first current being greater than the second current; and generating the signal with a second value in response to the first current being smaller than or equal to the second current.

17. The method of claim 16, wherein the first value corresponds to a command to activate a battery charging operation of the semiconductor device.

18. The method of claim 12, wherein the method further comprises:

detecting a first current at a first connection node between the first transistor and a fourth transistor of the semiconductor device, the fourth transistor being disposed between the first transistor and the battery along the wireless charging path;

detecting a second current at a second connection node between the fourth transistor and the battery;

generating a second signal based at least in part of the first current and the second current; and transmitting the second signal to a charger controller of the semiconductor device, the charger controller being configured to control an activation of the fourth transistor based at least in part on the second signal.

19. An integrated circuit comprising:
a wired connection;
a wireless connection;
a battery;
a wired charging path between the wired connection and the battery comprising:
a wired connector transistor;
a regulator transistor; and
a charger transistor;
a wireless charging path between the wireless connection and the battery comprising:
a rectifier transistor;
the regulator transistor; and
the charger transistor;
a rectifier controller that is configured to control an activation of the rectifier transistor; and
a power flow detector circuit that is configured to:
detect a current difference across the regulator transistor:
generate a signal based at least in part on the current difference; and
transmit the signal to the rectifier controller, the rectifier controller being configured to control the activation of the rectifier transistor based at least in part on the signal.

20. The integrated circuit of claim 19, wherein the integrated circuit further comprises:
a charger controller that is configured to control an activation of the charger transistor; and
a charging detector circuit that is configured to:
detect a first current at a first connection node between the rectifier transistor and the charger transistor;
detect a second current at a second connection node between the charger transistor and the battery;
generate a second signal based at least in part of the first current and the second current; and
transmit the second signal to the charger controller, the charger controller being configured to control the activation of the charger transistor based at least in part on the second signal.

* * * * *